(12) United States Patent
Sullivan

(10) Patent No.: US 11,761,052 B2
(45) Date of Patent: Sep. 19, 2023

(54) MULTI-THICKNESS WELDED VEHICLE STRUCTURE

(71) Applicant: Multimatic Inc., Markham (CA)

(72) Inventor: Mark Sullivan, Waterford, MI (US)

(73) Assignee: Multimatic Inc., Markham (CA)

( * ) Notice: Subject to any disclaimer, the term of this patent is extended or adjusted under 35 U.S.C. 154(b) by 0 days.

(21) Appl. No.: 17/801,019

(22) PCT Filed: Feb. 24, 2021

(86) PCT No.: PCT/CA2021/050211
§ 371 (c)(1),
(2) Date: Aug. 19, 2022

(87) PCT Pub. No.: WO2021/168554
PCT Pub. Date: Sep. 2, 2021

(65) Prior Publication Data
US 2023/0183831 A1    Jun. 15, 2023

Related U.S. Application Data

(60) Provisional application No. 62/980,685, filed on Feb. 24, 2020.

(51) Int. Cl.
*B21K 21/12* (2006.01)
*C21D 9/08* (2006.01)
(Continued)

(52) U.S. Cl.
CPC ............. *C21D 9/085* (2013.01); *B21K 21/12* (2013.01); *B23K 9/0282* (2013.01); *B23K 9/173* (2013.01);
(Continued)

(58) Field of Classification Search
None
See application file for complete search history.

(56) References Cited

U.S. PATENT DOCUMENTS

| 6,148,581 A | 11/2000 | Separautzki |
| 6,261,392 B1 * | 7/2001 | Sundgren ............... C21D 1/673 |
| | | 148/590 |
| 11,498,143 B2 * | 11/2022 | Kodama .............. B23K 9/0035 |

OTHER PUBLICATIONS

International Search Report and Written Opinion for International Application No. PCT/CA2021/050211, dated Jun. 3, 2022.

* cited by examiner

*Primary Examiner* — Daniel J. Schleis
(74) *Attorney, Agent, or Firm* — Borden Ladner Gervais LLP; Brandon L. Evenson

(57) ABSTRACT

A process for preparing a multi-thickness welded steel vehicle rail, the process comprises the steps of: (a) forming a first tube having a first outer diameter, an inner diameter and a first wall thickness; (b) forming a second tube having the first outer diameter, a second inner diameter and a second wall thickness different than the first wall thickness; (c) swaging a first end of the first tube to a second outer diameter less than the second inner diameter of the second tube; (d) inserting the swaged first end of the first tube into an end of the second tube to form a joint; (e) welding the first tube and the second tube together to form a weld at the joint to form a tube blank with a heat affected zone of lower metal strength in the area of the weld; (f) preheating the tube blank to create a common crystalline microstructure along a length of the tube blank; (g) introducing the tube blank into a blow molding tool having inner molding walls; (h) molding the tube blank at an elevated temperature by expanding the tube blank against the inner molding walls of the molding tool by injecting a pressurized medium into an interior cavity of the tube blank; and (i) quenching the tube blank by replacing the pressurized medium with a cooling medium through the molding tool and the tube blank to achieve a rapid cooling effect on the tube blank and to create a completed vehicle rail with essentially uniform material strength across the (Continued)

weld. A completed vehicle rail has an overlapped welded structure and uniform microcrystalline structure along the length of the rail.

12 Claims, 2 Drawing Sheets

(51) Int. Cl.
| | |
|---|---|
| *B23K 9/028* | (2006.01) |
| *B23K 9/173* | (2006.01) |
| *B23K 9/235* | (2006.01) |
| *B23K 33/00* | (2006.01) |
| *C21D 1/18* | (2006.01) |
| *C21D 1/56* | (2006.01) |
| *C21D 8/10* | (2006.01) |
| *C21D 9/50* | (2006.01) |

(52) U.S. Cl.
CPC ............ *B23K 9/235* (2013.01); *B23K 33/008* (2013.01); *C21D 1/18* (2013.01); *C21D 1/56* (2013.01); *C21D 8/105* (2013.01); *C21D 9/505* (2013.01); *C21D 2211/008* (2013.01)

MULTI-THICKNESS WELDED VEHICLE STRUCTURE

FIELD OF THE INVENTION

This invention is in the field of structural rails and in, particular, rails to which the pillars of an automobile or other vehicle components may be mounted.

BACKGROUND TO THE INVENTION

Certain applications, especially in the automotive field, require metallic tubes as structural elements. Such an application is a rail to which the A, B and C pillars of an automobile may be mounted. Given the different forces to which an automobile is subjected, for example during collisions, and as a result of the characteristics of the components or structures which may be attached to a rail, certain portions of the rail will have different strength requirements than other portions of the rail. For example, in a typical vehicle rail, the area between the A and B pillars will typically require greater strength than other sections of the rail. When manufacturing a rail, a single metallic tube may be used, but a uniformly thicker tube will add to the weight of the vehicle while a uniformly thinner tube will not provide sufficient strength where required. Moreover, it is relatively expensive to create a single tube with portions of varying wall thickness along its length to fulfil different strength requirements along the rail. It would be less expensive to weld together two (or more) tubes with differing wall thicknesses but with the same outer diameter. This would provide a rail using tube sections of different wall thicknesses which are relatively less expensive to manufacture but which still saves weight and cost by having the thicker material only where required.

U.S. Pat. No. 5,333,775 (Bruggemann et al.) describes a method of constructing parts with varying wall thicknesses by welding end to end linear tubes having different wall thicknesses. Laser butt-welding of steel tubes to form a tube blank is specifically discussed. Normally, tubes with a common outer diameter are joined. If tubes of different outer diameters are to be joined, the ends of one or both tubes are flared out or tapered down to correspond with the outer diameter of the opposing tube. Then the tube ends, now with a common outer diameter, are butt-jointed. Following welding of the linear tubes, the excess weld metal on the outside surface is removed to smooth that surface to prepare the blank for further processing. Then, the welded tube blank is bent using conventional means along its longitudinal axis to a U-shape corresponding to the shape of a die into which the blank is placed. Hydroforming of the U-shaped part then occurs. Hydroforming typically occurs under high hydraulic pressures in the range of 9000 p.s.i. at relatively low temperatures, such as room temperature. The metals used for hydroforming must be sufficiently ductile or formable at room temperature to be so formed without heating.

Butt-jointed welds present certain disadvantages. Without overlap, any discontinuity in the weld may lead to loss of strength, potential corrosion and the possibility of fracture at the weld. Thus, it would be an advantage to join tubes of different thicknesses but with a common outer diameter, yet to overlap the tubes to create a stronger, more secure joint using MAG welding or the like. An issue with welding overlapped tubes together, however, is typically the formation of a Heat Affected Zone (HAZ) in the area of the weld. The HAZ extends somewhat into the tubes at either side of the weld. The microstructure and properties in the HAZ are different than those of the base metal. Thermally activated softening phenomena, such as grain growth and tempering in the case of martensitic steels, are responsible for the poor mechanical properties of the material in the HAZ. The changed mechanical properties of the metal in the HAZ are usually undesirable, and the material in the HAZ is usually of lower strength than the base metal following welding.

SUMMARY OF THE INVENTION

We have devised a process to weld together two or more metallic tubes of different wall thicknesses, but the same outer diameter, while avoiding certain limitations in the prior art. In particular, the process allows use of multiple, typically roll-formed, tubes which have individual uniform wall thickness without the need to create increased wall thickness in portions of the individual tubes themselves. In the case of welding two tubes of different wall thicknesses, the thicker tube is more expensive per unit length since it requires more material for its thicker wall. This permits the welded structure, now referred to as a tube blank, to have the greater strength of the thicker-walled tube in an area where that strength is required, and the lesser cost and weight of the thinner-walled tube in an area where less strength is required. In addition, certain disadvantages respecting the effect of welding are overcome. The metallic tubes employed in the process are typically comprised of steel. Welding of these tubes at a joint creates a microcrystalline structure adjacent the weld known as a heat affected zone, or HAZ, which differs from the microcrystalline structure of the remainder of the material of the tube blank. By preheating the welded tube blank in an oven, the entire tube blank assumes an austenitic microcrystalline structure. Then the welded tube blank is blow formed in a mold to its final shape using a pressurized gaseous medium and finally quenched using a liquid cooling medium. Following quenching, the entire completed rail, with the possible exception of the material from the welding wire, now has a desirable martensitic microcrystalline structure. A completed vehicle rail suitable for installation in a vehicle is the result.

In a principal aspect of the invention, a process for preparing a multi-thickness welded steel vehicle rail, the process comprises the steps of: (a) forming a first tube having a first outer diameter, an inner diameter and a first wall thickness; (b) forming a second tube having the first outer diameter, a second inner diameter and a second wall thickness different than the first wall thickness; (c) swaging a first end of the first tube to a second outer diameter less than the second inner diameter of the second tube; (d) inserting the swaged first end of the first tube into an end of the second tube to form a joint; (e) welding the first tube and the second tube together to form a weld at the joint to form a tube blank with a heat affected zone of lower metal strength in the area of the weld; (f) preheating the tube blank to create a common crystalline microstructure along a length of the tube blank; (g) introducing the tube blank into a blow molding tool having inner molding walls; (h) molding the tube blank at an elevated temperature by expanding the tube blank against the inner molding walls of the molding tool by injecting a pressurized medium into an interior cavity of the tube blank; and (i) quenching the tube blank by replacing the pressurized medium with a cooling medium through the molding tool and the tube blank to achieve a rapid cooling effect on the tube blank and to create a completed vehicle rail with essentially uniform material strength across the weld.

In a further aspect of the invention, the tube blank includes at least two openings for feeding and removing respectively the pressurized medium and the cooling medium to be circulated through the interior of the tube blank.

In a further aspect of the invention, the pressurized medium is gaseous and the cooling medium is liquid.

In a further aspect of the invention, the pressurized gaseous medium is selected from air and nitrogen and the cooling medium is water.

In a further aspect of the invention, the welding comprises MAG welding.

In a further aspect of the invention, the material of the tube blank is steel which has an austenitic crystalline microstructure following preheating and during molding, and a martensitic crystalline microstructure following quenching.

In a further aspect of the invention, the second wall thickness is greater than the first wall thickness.

In a further aspect of the invention, the first wall thickness is greater than the second wall thickness.

In a further aspect of the invention, a blow-formed, multi-thickness welded vehicle steel rail comprises: (a) a first tube having a first outer diameter, an inner diameter and a first wall thickness; (b) a second tube having the first outer diameter, a second inner diameter and a second wall thickness different than the first wall thickness; (c) a first end of the first tube swaged to a second outer diameter less than the second inner diameter of the second tube; (d) the swaged first end of the first tube inserted into an end of the second tube and forming a joint; (e) the first tube and the second tube welded together at the joint to form a tube blank; (f) the tube blank having been subjected to thermomechanical processing comprising preheating, blow molding and quenching.

DETAILED DESCRIPTION OF THE INVENTION

Figure 1:
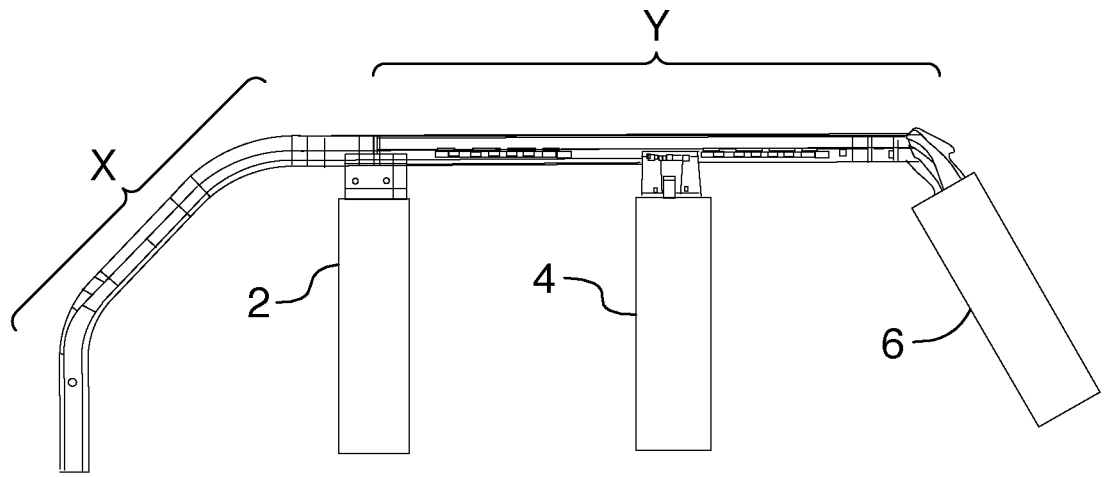
FIG. 1 is an elevation view of a vehicle rail attached to vehicle A, B and C pillars.

A typical vehicle rail structure, in this case a cant rail, is illustrated in FIG. 1. Although a cant rail is depicted, the invention is applicable to other suitable rails.

Figure 2:
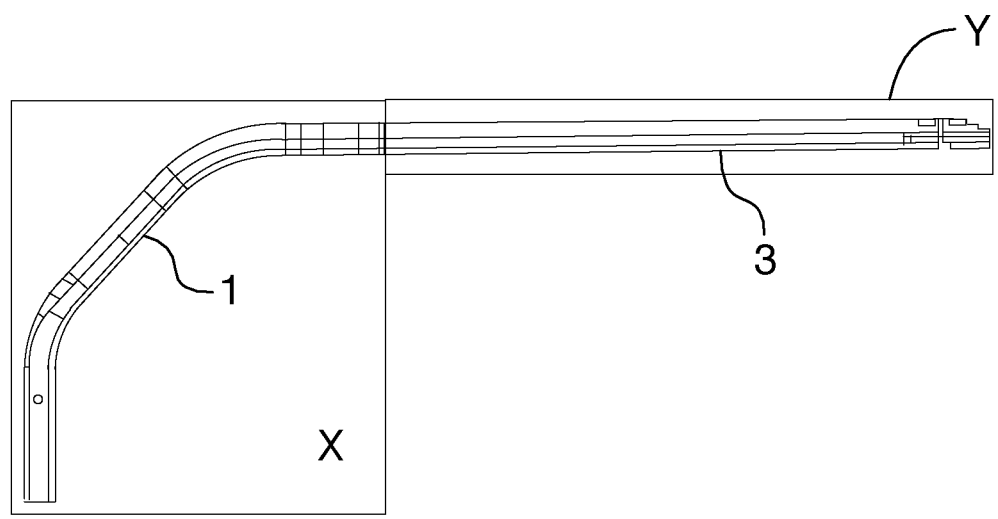
FIG. 2 is an elevation view of a vehicle rail showing zones requiring greater and lesser strength.

FIG. 1 illustrates a rail which is connected to each of a vehicular C pillar 2, B pillar 4 and A pillar 6. The rail portion in Zone X, also illustrated in FIG. 2, requires lower strength and stiffness than the rail portion in Zone Y. This can be achieved by using a lighter weight tube in Zone X to help lower the weight and material cost of the rail and to contribute to overall weight savings in the vehicle. By contrast, the rail portion in Zone Y is preferably of higher strength and stiffness to provide side impact collision strength. This can be achieved by using a heavier gage metallic tube in Zone Y. Although the illustrated example depicts the thinner-walled tube in Zone X and the thicker-walled tube in Zone Y, these may be reversed.

Figure 3A:
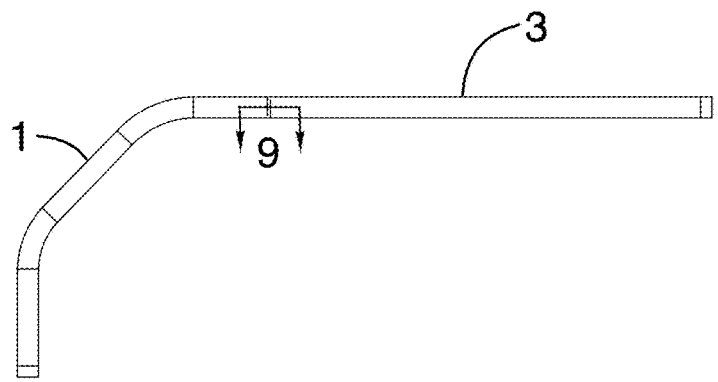
FIG. 3A is an elevation view of a vehicle rail formed of tubes with different wall thicknesses.
Figure 3B:
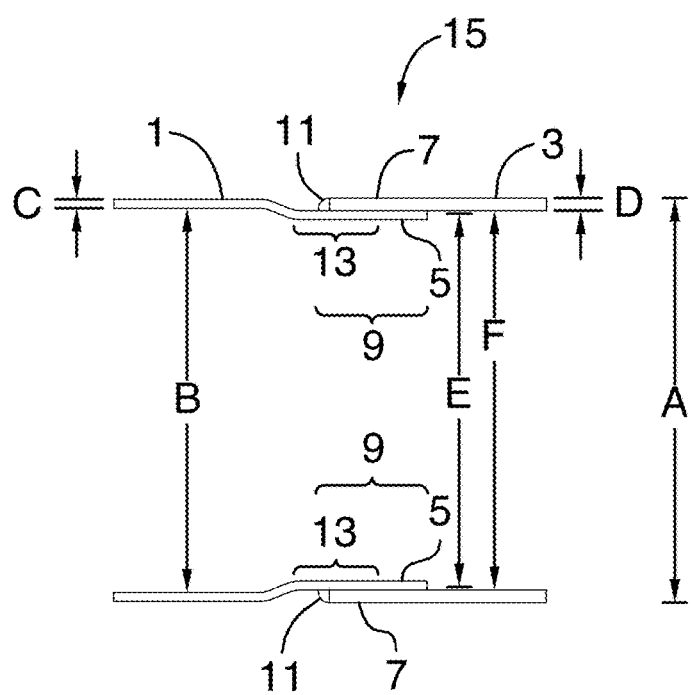
FIG. 3B is a cross-sectional elevation view showing a joint of tubes with varying wall thickness but uniform external diameter.
Figure 4:
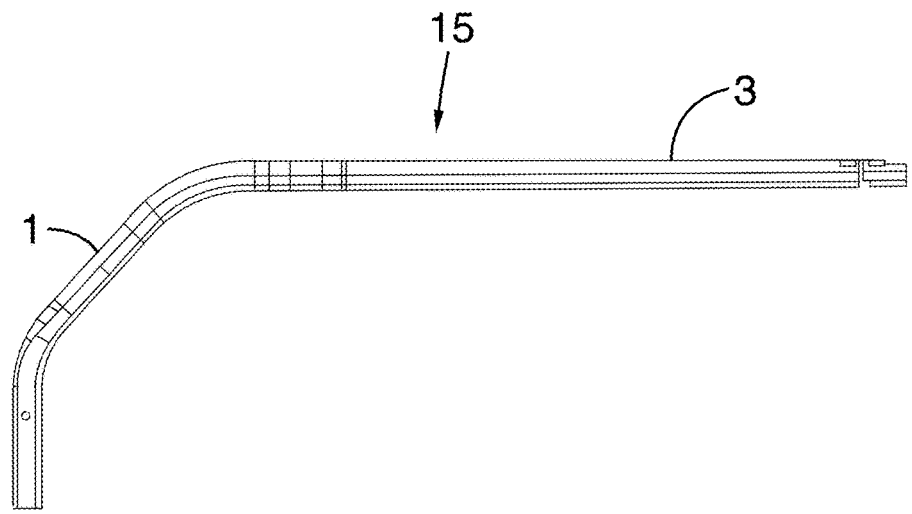
FIG. 4 is an elevation view of a tube blank ready for preheating and blow forming.

In an example embodiment, first tube 1 in Zone X has a wall thickness of 1.8 mm while second tube 3 in Zone Y has a wall thickness of 2.2 mm. As best illustrated in FIG. 3B, the first tube 1 has a first outer diameter A, an inner diameter B and a first wall thickness C. The second tube 3 has the same first outer diameter A, a second inner diameter F and a second wall thickness D greater than the first wall thickness C.

In order to create an overlapping joint with maximum strength and minimum processing, a first end 5 of the thinner first tube 1 is swaged to decrease its outer diameter to a second outer diameter E which is marginally less than the second inner diameter F of the second tube 3, thus allowing the swaged first end 5 to slide inside an end 7 of the thicker second tube 3, with minimal clearance, approximately to the extent of the swaged portion. This overlapped area forms the joint 9. The first tube 1 and the second tube 3 are then circumferentially welded at weld 11 to create a strong overlapped joint, typically using MAG welding or a similar process. The welding process, however, creates a lower strength Heat Affected Zone, or HAZ, 13 in the vicinity of the joint 9. Following welding, the joined tubes 1, 3 are referred to as a tube blank 15 ready for further processing. We have discovered that the HAZ 13 can be virtually eliminated by further processing the tube blank 15 to its final shape.

As noted, although the illustrated embodiment provides that an end of the thinner tube is swaged and inserted into an end of the thicker tube, this could be reversed with the end of a thicker tube being swaged and inserted into the end of a thinner tube.

Post-welding, the tube blank 15 is heated, typically in an oven or furnace, prior to forming. This preheating process creates an almost uniform crystalline microstructure of the entire part with improved formability at elevated temperatures. During this heat treatment, which is similar to the first two stages of a homogenization process (with heating and "soaking" stages), the material is heated sufficiently (to the austenization temperature in the case of steels), and is then held at a homogenization temperature for a period of time. Since the "soaking" time for full homogenization is substantially long, this heat treatment usually results in partial homogenization of the material. The tube blank has an austenitic crystalline microstructure following this preheating which is intermediate between the initial crystalline microstructure of the unwelded metal tubes and the final martensitic crystalline microstructure of the completed rail. At this stage, following preheating, the HAZ 13 and the remainder of the tube blank 15 have almost the same crystalline microstructure, but not the final desired crystalline microstructure of the completed rail, which can be obtained by an appropriate thermomechanical process (typically hot deformation) and subsequent quenching.

Next, the preheated tube blank is placed directly into a mold and a pressurized gas process in the nature of blow molding is performed to expand the diameter of the tube blank and to alter its shape appropriately along its length, as known in the art. For example, the circular tube blank can be made rectangular in areas where the A, B and C pillars must be welded to it, or along its entire length as desired. It may have a varying outer perimeter along its length. The particular shape of the final rail is not determinative.

An exemplary blow molding process is generally described in U.S. Pat. No. 6,261,392 (Sundgren et al.), although any suitable process may be employed. This process involves injecting gas (not liquid), such as compressed air or nitrogen under high pressure, into the interior of a tube blank which expands the heated tube blank part to the interior profile of the mold tool to shape the part. Typically, the preheating treatment is designed so that the temperature of the tube blank is within the austenitic temperature range at the commencement of the blow forming process. Thus, this may be considered as a hot deformation process. The pressures required, however, typically in the range of 1200 to 1500 p.s.i., and up to 8700 p.s.i., are considerably lower than those required for hydroforming unheated tubes. Since the tube blank is typically open at each end, the pressurized gas may be introduced or removed at either end of the tube blank. Alternatively, openings other than at the ends of the tube blank may be provided.

Finally, while still in the mold, the part which is now in its desired shape, is quenched to cool it to close to room temperature using a cooling medium, such as water. Again, the cooling medium may be introduced and removed at suitable openings in the tube blank. The quenching process alters the microcrystalline structure of the tube blank, which has now become the completed rail. Thus, in the case of a steel part, the austenite phase of the tube blank or rail material at the deformation temperature is transformed to the hardened martensite phase of the material during quenching. We have discovered that following this thermomechanical processing, the rail has a relatively uniform and desirable final crystalline microstructure along its entire length, even if the material from the weld wire itself is not of identical structure. There is minimal difference between the welded portion, formerly the heat affected zone or HAZ, and the remainder of the part in this respect, and thus minimal loss of hardness and strength at the weld. The homogenized microstructure and hardness (which is an indication of strength across the parent material, the Heat Affected Zone 13 and the weld 11) allows welded tubes with different wall thicknesses to be substituted for single tubes with varying wall thickness. This saves significant costs in material and/or processing. It also avoids certain problems with butt-welded joints.

It should be understood that although particular component arrangements are disclosed in the illustrated embodiments, other arrangements will benefit from this invention. Although particular step sequences are shown and described, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although example embodiments have been disclosed, a worker of ordinary skill in this art would recognize that certain modifications would come within the scope of the claims. For that reason, the following claims should be studied to determine their true scope and content.

The invention claimed is:

1. A blow-formed, multi-thickness welded vehicle steel tubular structure comprising:
   (a) a first tube having a first outer diameter, an inner diameter and a first wall thickness;
   (b) a second tube having the first outer diameter, a second inner diameter and a second wall thickness different than the first wall thickness;
   (c) a first end of the first tube swaged to a second outer diameter less than the second inner diameter of the second tube;
   (d) the swaged first end of the first tube inserted into an end of the second tube and forming a joint;
   (e) the first tube and the second tube welded together at the joint using MAG welding to form a tube blank;
   (f) the tube blank having been subjected to thermomechanical processing comprising preheating, blow molding and quenching.

2. The blow-formed, multi-thickness welded vehicle steel tubular structure of claim 1, wherein the second wall thickness is greater than the first wall thickness.

3. The blow-formed, multi-thickness welded vehicle steel tubular structure of claim 1, wherein the first wall thickness is greater than the second wall thickness.

4. The blow-formed, multi-thickness welded vehicle steel tubular structure of any one of claims 1 to 3, wherein the tubular structure is a rail.

5. A process comprising:
   (a) forming a first tube having a first outer diameter, an inner diameter and a first wall thickness;
   (b) forming a second tube having the first outer diameter, a second inner diameter and a second wall thickness different than the first wall thickness;
   (c) swaging a first end of the first tube to a second outer diameter less than the second inner diameter of the second tube;
   (d) inserting the swaged first end of the first tube into an end of the second tube to form a joint;
   (e) welding the first tube and the second tube together using MAG welding to form a weld at the joint to form a tube blank with a heat affected zone of lower metal strength in the area of the weld;
   (f) preheating the tube blank to create a common crystalline microstructure along a length of the tube blank;
   (g) introducing the tube blank into a blow molding tool having inner molding walls;
   (h) molding the tube blank at an elevated temperature by expanding the tube blank against the inner molding walls of the molding tool by injecting a pressurized medium into an interior cavity of the tube blank; and
   (i) quenching the tube blank by replacing the pressurized medium with a cooling medium through the molding tool and the tube blank to achieve a rapid cooling effect on the tube blank and to create a completed vehicle multi-thickness welded tubular structure with essentially uniform material strength across the weld.

6. The process according to claim 5, wherein the tube blank includes at least two openings for feeding and removing respectively the pressurized heating medium and the cooling medium to be circulated through the interior of the tube blank.

7. The process according to claim 5, wherein the pressurized heating medium is gaseous and the cooling medium is liquid.

8. The process according to claim 7, wherein the pressurized gaseous heating medium is selected from air and nitrogen and the cooling medium is water.

9. The process according to claim 5, wherein the material of the tube blank is steel which has an austenitic crystalline microstructure following preheating and during molding, and a martensitic crystalline microstructure following quenching.

10. The process according to claim 5, wherein the second wall thickness is greater than the first wall thickness.

11. The process according to claim 5, wherein the first wall thickness is greater than the second wall thickness.

12. The process according to any one of claims 5 to 11, wherein the tubular structure is a rail.

\* \* \* \* \*